United States Patent
Zhou et al.

(10) Patent No.: US 11,102,647 B2
(45) Date of Patent: Aug. 24, 2021

(54) DATA COMMUNICATION CONNECTION, TRANSMITTING, RECEIVING, AND EXCHANGING METHOD AND SYSTEM, MEMORY, AND AERIAL VEHICLE

(71) Applicant: SZ DJI TECHNOLOGY CO., LTD., Shenzhen (CN)

(72) Inventors: Yi Zhou, Shenzhen (CN); Zhun Ding, Shenzhen (CN); Yongsen Chen, Shenzhen (CN); Ming Gong, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 146 days.

(21) Appl. No.: 16/000,396

(22) Filed: Jun. 5, 2018

(65) Prior Publication Data

US 2019/0174303 A1    Jun. 6, 2019

Related U.S. Application Data

(63) Continuation of application No. PCT/CN2015/097069, filed on Dec. 10, 2015.

(51) Int. Cl.
*H04L 29/06* (2006.01)
*H04W 12/03* (2021.01)
(Continued)

(52) U.S. Cl.
CPC .......... *H04W 12/03* (2021.01); *G08G 5/0026* (2013.01); *H04L 9/083* (2013.01);
(Continued)

(58) Field of Classification Search
CPC .......... H04W 12/001; H04W 12/0401; H04W 76/10; G08G 5/0026; G08G 5/0039;
(Continued)

(56) References Cited

U.S. PATENT DOCUMENTS 5,519,761 A * 5/1996 Gilhousen .......... H04B 7/18506
455/431
6,351,536 B1 * 2/2002 Sasaki ................... G06F 21/606
380/255
(Continued)

FOREIGN PATENT DOCUMENTS

CN         101141680 A    3/2008
CN         101247160 A    8/2008
(Continued)

OTHER PUBLICATIONS

O. V. Zbrutsky, et al., Unmanned aerial vehicles and technologies by NTUU "KPI", Oct. 2013, 2013 IEEE 2nd International Conference Actual Problems of Unmanned Air Vehicles Developments Proceedings (APUAVD), pp. 1-2.*
(Continued)

*Primary Examiner* — Maung T Lwin
(74) *Attorney, Agent, or Firm* — Anova Law Group, PLLC

(57) ABSTRACT

A method for establishing a data connection between a mobile terminal and a server includes sending a request for data connection to the server, generating a random password, transmitting the random password to the server for storing in the server, establishing the data connection between the mobile terminal and the server, and encrypting data to be transmitted through the communication connection using the random password.

15 Claims, 9 Drawing Sheets

(51) Int. Cl.
*H04L 9/08* (2006.01)
*H04W 12/041* (2021.01)
*H04W 76/10* (2018.01)
*G08G 5/00* (2006.01)

(52) U.S. Cl.
CPC .......... *H04L 9/0822* (2013.01); *H04L 9/0825* (2013.01); *H04L 63/166* (2013.01); *H04W 12/041* (2021.01); *H04W 76/10* (2018.02); *H04L 2209/84* (2013.01)

(58) Field of Classification Search
CPC ... G08G 5/0091; H04L 9/0822; H04L 9/0825; H04L 9/083; H04L 63/166; H04L 2209/84; G06Q 1/00; G06Q 10/00; G06Q 30/00; G06F 17/30; G06F 17/30867; G01C 21/20; G06C 30/0625
See application file for complete search history.

(56) References Cited

U.S. PATENT DOCUMENTS

| | | | | |
|---|---|---|---|---|
| 6,788,935 | B1* | 9/2004 | McKenna | H01Q 1/246 455/431 |
| 7,136,016 | B1* | 11/2006 | Swensen | G01S 5/14 342/455 |
| 8,566,412 | B2* | 10/2013 | Barman | H04L 51/38 709/206 |
| 8,649,808 | B2* | 2/2014 | Neely | H04W 4/12 455/466 |
| 8,850,540 | B2* | 9/2014 | Lin | H04L 63/0428 380/28 |
| 9,059,988 | B2* | 6/2015 | Choi | G06F 21/608 |
| 9,266,610 | B2* | 2/2016 | Knapp | B64C 39/024 |
| 9,705,706 | B2* | 7/2017 | John | H04L 12/2874 |
| 9,734,723 | B1* | 8/2017 | Bruno | G08G 5/0056 |
| 9,805,372 | B2* | 10/2017 | Gong | H04L 67/12 |
| 9,842,505 | B2* | 12/2017 | Wang | B64D 47/08 |
| 10,223,921 | B2* | 3/2019 | Navarro Felix | G05D 1/0088 |
| 10,467,422 | B1* | 11/2019 | Roth | G06F 21/602 |
| 10,638,315 | B2* | 4/2020 | Kim | H04M 1/66 |
| 2003/0225489 | A1* | 12/2003 | Tsao | B64C 13/18 701/9 |
| 2004/0122965 | A1* | 6/2004 | Apfel | H04L 67/14 709/232 |
| 2005/0159890 | A1* | 7/2005 | Humphries | H04L 12/66 701/469 |
| 2007/0284474 | A1* | 12/2007 | Olson | H04W 4/40 244/10 |
| 2008/0039988 | A1* | 2/2008 | Estabrook | G08G 5/0056 701/14 |
| 2008/0085691 | A1* | 4/2008 | Harvey | H04B 7/18508 455/187.1 |
| 2008/0133747 | A1* | 6/2008 | Fish | H04L 63/102 709/224 |
| 2011/0235546 | A1* | 9/2011 | Horn | H04W 48/17 370/254 |
| 2011/0320068 | A1* | 12/2011 | Lee | G05D 1/0016 701/2 |
| 2012/0309351 | A1* | 12/2012 | Dutta | G06Q 30/016 455/411 |
| 2013/0298208 | A1* | 11/2013 | Ayed | H04L 27/00 726/6 |
| 2014/0073289 | A1* | 3/2014 | Velasco | H04W 12/04031 455/411 |
| 2014/0166817 | A1* | 6/2014 | Levien | B64C 39/024 244/190 |
| 2014/0215583 | A1* | 7/2014 | Ding | H04W 12/06 726/5 |
| 2014/0348062 | A1* | 11/2014 | Anwar | H04W 28/08 370/328 |
| 2015/0120094 | A1* | 4/2015 | Kimchi | G05D 1/00 701/3 |
| 2015/0254988 | A1* | 9/2015 | Wang | B64D 47/08 701/3 |
| 2015/0293225 | A1* | 10/2015 | Riley | G01S 17/88 356/4.01 |
| 2016/0092958 | A1* | 3/2016 | Goldstein | G06Q 30/0625 705/26.62 |
| 2016/0147506 | A1* | 5/2016 | Britt | H04L 67/10 717/107 |
| 2016/0242194 | A1* | 8/2016 | Mitola | H04W 72/12 |
| 2016/0270141 | A1* | 9/2016 | Sharma | H04W 76/16 |
| 2017/0006513 | A1* | 1/2017 | Lee | H04W 36/02 |
| 2017/0034820 | A1* | 2/2017 | Liu | H04L 12/4633 |
| 2017/0041859 | A1* | 2/2017 | Martin | H04W 48/16 |
| 2017/0126654 | A1* | 5/2017 | Fu | H04L 9/3226 |
| 2017/0289799 | A1* | 10/2017 | Hawkes | H04L 63/0892 |
| 2017/0347272 | A1* | 11/2017 | Ahmavaara | H04W 16/14 |
| 2018/0227835 | A1* | 8/2018 | Martin | H04W 48/14 |
| 2018/0253092 | A1* | 9/2018 | Trapero Esteban | H04W 12/06 |
| 2018/0279105 | A1* | 9/2018 | Huber | H04W 76/50 |
| 2018/0295110 | A1* | 10/2018 | Chen | H04L 63/0442 |
| 2018/0322539 | A1* | 11/2018 | Thazhathekalam | G06Q 30/0267 |
| 2018/0375568 | A1* | 12/2018 | De Rosa | H04W 72/04 |
| 2019/0020214 | A1* | 1/2019 | Ho | H02J 7/027 |

FOREIGN PATENT DOCUMENTS

| | | | | |
|---|---|---|---|---|
| CN | 101358856 | A | | 2/2009 |
| CN | 101621738 | A | | 1/2010 |
| CN | 101656608 | A | | 2/2010 |
| CN | 101799979 | A | | 8/2010 |
| CN | 101939622 | A | | 1/2011 |
| CN | 102025503 | A | | 4/2011 |
| CN | 102833709 | A | | 12/2012 |
| CN | 103491180 | A | | 1/2014 |
| CN | 103491180 | A | * | 1/2014 |
| CN | 103957566 | B | * | 4/2014 ......... H04L 12/4633 |
| CN | 103903406 | A | | 7/2014 |
| CN | 103944630 | A | | 7/2014 |
| CN | 104468122 | A | | 3/2015 |
| CN | 104993928 | A | | 10/2015 |
| CN | 105206116 | A | * | 12/2015 |
| CN | 105739535 | A | * | 7/2016 |
| CN | 103491180 | B | * | 4/2017 |
| CN | 110176999 | A | * | 8/2019 |
| EP | 2894810 | A1 | | 7/2015 |
| EP | 2854325 | B1 | * | 9/2017 ......... H04L 1/0026 |
| JP | 2015035072 | A | | 2/2015 |
| WO | 2015163822 | A1 | | 10/2015 |
| WO | WO-2017211623 | A1 | * | 12/2017 ......... H04W 12/06 |

OTHER PUBLICATIONS

Rgagnon, Encrypt a password, https://www.rgagnon.com/javadetails/java-0400.html, Aug. 2008, pp. 1-4.*

The World Intellectual Property Organization (WIPO) International Search Report for PCT/CN2015/097069 dated Aug. 31, 2016 9 Pages.

* cited by examiner

DATA COMMUNICATION CONNECTION, TRANSMITTING, RECEIVING, AND EXCHANGING METHOD AND SYSTEM, MEMORY, AND AERIAL VEHICLE

CROSS-REFERENCE TO RELATED APPLICATION

This application is a continuation application of International Application No. PCT/CN2015/097069, filed on Dec. 10, 2015, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to communication control or industrial control type application programs and, more particularly, to a data communication connection method and system, a flight data transmitting, receiving, and exchanging method and system, a memory, and an aerial vehicle.

BACKGROUND

With the development of science and technology, unmanned aerial vehicles are increasingly adopted in people's daily life. To ensure the normal and legitimate operations of the aerial vehicles, people often manage the aerial vehicles through an aerial vehicle regulatory platform. When an aerial vehicle performs a flying task, the flight data may be uploaded to the aerial vehicle regulatory platform. The existing aerial vehicle regulatory platform and data exchange system may provide little or no security during the transmission of the flight data. Thus, the flight data exchanging may be insecure and unauthorized parties may access or tamper the flight data.

SUMMARY

In accordance with the disclosure, there is provided a method for establishing a data connection between a mobile terminal and a server. The method includes sending a request for data connection to the server, generating a random password, transmitting the random password to the server for storing in the server, establishing the data connection between the mobile terminal and the server, and encrypting data to be transmitted through the communication connection using the random password.

Also in accordance with the disclosure, there is provided a message push method including generating a message, determining whether a mobile terminal is online, and sending the message to the mobile terminal in response to determining that the mobile terminal is online.

Also in accordance with the disclosure, there is provided a flight data regulatory system including a control terminal and a processor configured to receive flight data, determine a category of the flight data based on a flight code in the flight data, and store the flight data according to the category.

Also in accordance with the disclosure, there is provided an aerial vehicle controller including a control terminal and a processor configured to receive a data transmission instruction, generate a flight code in response to the data transmission instruction and append the flight code to flight data of an aerial vehicle, and upload the flight data with the flight code to a server.

Also in accordance with the disclosure, there is provided an aerial vehicle including a functional component and an aerial vehicle controller coupled to the functional component. The aerial vehicle controller includes a control terminal and a processor configured to receive a data transmission instruction from the functional component, generate a flight code in response to the data transmission instruction and append the flight code to flight data of the aerial vehicle, and upload the flight data with the flight code to a server.

DESCRIPTION OF MAIN REFERENCE NUMERALS

Figure 1:
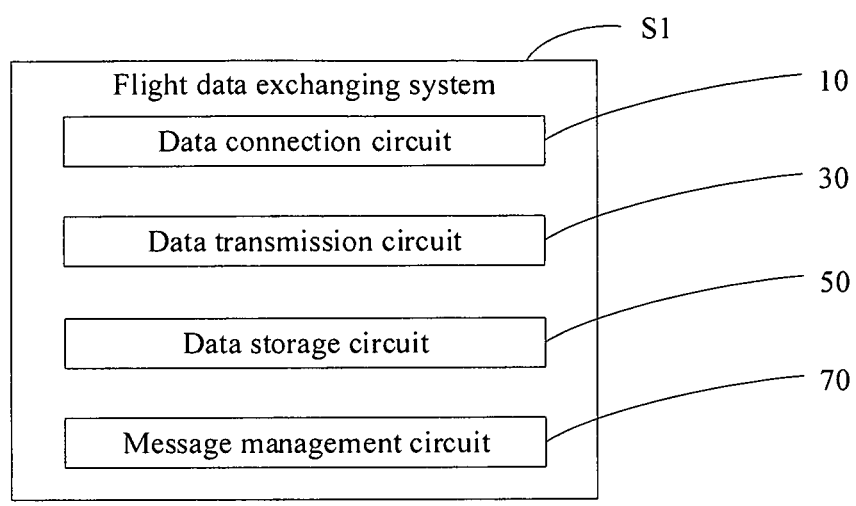
FIG. 1 is a schematic structural diagram of a flight data exchanging system according to an example embodiment.

Flight data exchanging system S1
Data connection circuit 10
Connection sub-circuit 12
Encryption key sub-circuit 14
Calculation sub-circuit 16
Data transmission circuit 30
Processing sub-circuit 32
Encryption sub-circuit 34
Transmission sub-circuit 36
Data storage circuit 50
Decryption sub-circuit 51
Query sub-circuit 52
Storage sub-circuit 54
Refresh sub-circuit 56
Feedback sub-circuit 58
Message management circuit 70
Detection sub-circuit 72
Transmitting sub-circuit 74
Aerial vehicle 100

First memory 110
First processor 130
First data transmitter 150
First data receiver 170
Storage terminal 200
Second memory 210
Second processor 230
Second data transmitter 250
Second data receiver 270
Control terminal 300
Controller 330
Data transceiver 350

Embodiments of the present disclosure will be described in detail with reference to the accompanying drawings.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

The embodiments described below and/or features thereof can be combined as needed, unless they conflict with each other.

Figure 2:
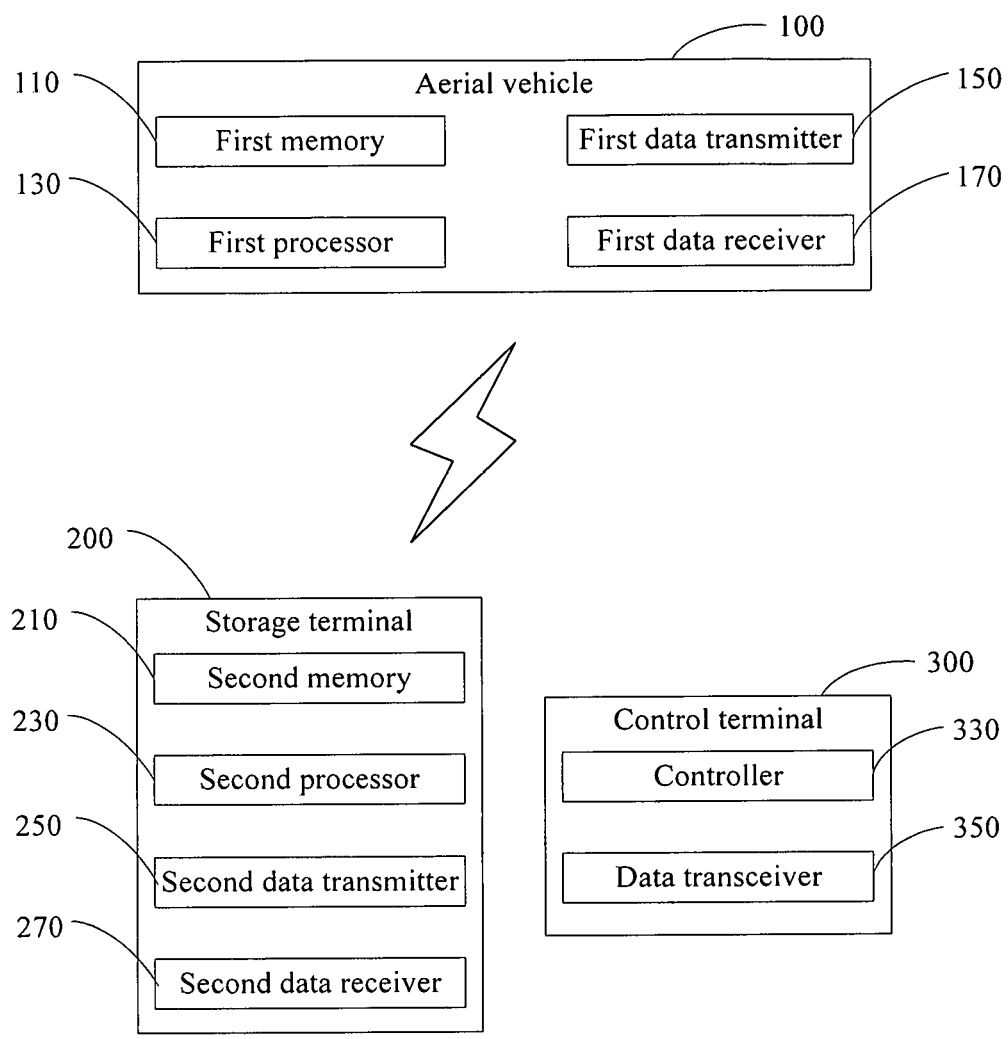
FIG. 2 is a schematic diagram of an example operation environment of the flight data exchanging system in FIG. 1.

FIG. 1 is a schematic structural diagram of a flight data exchanging system S1 according to an example embodiment. FIG. 2 is a schematic diagram of an example operation environment of the flight data exchanging system S1 in FIG. 1. The flight data exchanging system S1 in FIG. 1 may operate in the environment shown in FIG. 2. As shown in FIG. 2, the operation environment includes an aerial vehicle 100, a control terminal 300, and a storage terminal 200. The flight data of the aerial vehicle 100 may be sent to the storage terminal 200, where the flight data may be archived or managed. The example operation environment shown in FIG. 2 is illustrative and an operation environment consistent with the disclosure can include other devices. For example, the operation environment can include a mobile terminal, and the aerial vehicle 100 can be an example of the mobile terminal. As another example, the storage terminal 200 may include a server or be a part of a server, where the server can include an aerial vehicle regulatory platform.

In some embodiments, the flight data exchanging system S1 may be an aerial vehicle regulatory system. The aerial vehicle regulatory system may receive and store flight data of the aerial vehicle for the purpose of regulating the flight behavior of the aerial vehicle. The flight data may include, but are not limited to, the aerial vehicle's GPS location information, flight time, flight altitude, flight speed, flight route, and flight posture. In some embodiments, the storage terminal 200 may include an aerial vehicle regulatory platform and the control terminal 300 may include a remote controller for the aerial vehicle 100. The aerial vehicle regulatory system may operate on the aerial vehicle regulatory platform, the remote controller, and the aerial vehicle 100. In some embodiments, the control terminal 300 may be arranged at the aerial vehicle 100. That is, the control terminal 300 may be a component of the aerial vehicle 100 for controlling the operation of the aerial vehicle 100. The control terminal 300 may control the aerial vehicle 100 to upload the flight data to the storage terminal 200 and control the storage terminal 200 to return a status of the flight data transmission to the aerial vehicle 100. The aerial vehicle 100 may request a data connection to the storage terminal 200 and transmit the flight data to the storage terminal 200. The storage terminal 200 may receive and store the flight data and return the status of the flight data transmission to the aerial vehicle 100.

As shown in FIG. 1, the flight data exchanging system S1 includes a data connection circuit 10, a data transmission circuit 30, a data storage circuit 50, and a message management circuit 70. The data connection circuit 10 may establish a data communication between the storage terminal 200 and the aerial vehicle 100. The data transmission circuit 30 may control the aerial vehicle 100 to transmit the flight data. The data storage circuit 50 may control the storage terminal 200 to receive the flight data and control the storage terminal 200 to return the status of the flight data transmission. The message management circuit 70 may control the storage terminal 200 to transmit messages to the aerial vehicle 100.

FIG. 2 shows functional components of the aerial vehicle 100, the storage terminal 200, and the control terminal 300 according to disclosed embodiments. The aerial vehicle 100 includes a first memory 110, a first processor 130, a first data transmitter 150, and a first data receiver 170. In some embodiments, the aerial vehicle 100 may include one or more other functional components, such as a flight controller, an electronic regulator, a stabilizer, and/or a remote controller. In some embodiments, the one or more functional components of the aerial vehicle may transmit flight data of the aerial vehicle 100 to a server, such as the storage terminal 200, through an aerial vehicle controller. In some embodiments, the control terminal 300 may be arranged at the aerial vehicle 100 and functions as the aerial vehicle controller of the aerial vehicle 100.

The first memory 110 may store the flight data, identification information of the aerial vehicle 100 (hereinafter referred to as "aerial vehicle ID" for short), and a corresponding flight code. In addition, the first memory 110 may store an encryption password. The encryption password may include a password, an encryption key, and other desired information to encrypt and decrypt the flight data and the status of the flight data transmission. In some embodiments, the password may include an encryption password to encrypt the flight data and the encryption key may include a public key for the storage terminal 200 (hereinafter referred to as "storage terminal public key"). Similarly, in the embodiments that the storage terminal 200 includes or is part of a server, the public key for the server is also referred to as a "server public key."

The aerial vehicle ID may be an identification code of the aerial vehicle 100, which includes specific information for identifying the aerial vehicle 100, such as an aerial vehicle sequence number. The aerial vehicle ID may uniquely identify the aerial vehicle 100. The aerial vehicle ID may be burned into a controller of the aerial vehicle 100 ex-factory. Every aerial vehicle may have a unique aerial vehicle ID. The aerial vehicle ID may be stored in the storage terminal 200, such that the storage terminal 200 may use the aerial vehicle ID to verify the origin of the flight data.

The flight code may be an identification code of the flight data. Every piece of flight data may correspond to a unique flight code. The flight code may be appended to the flight data to allow the storage terminal 200 to index the flight data or categorize the flight data for storage.

The encryption password may encrypt the flight data to ensure the security and confidentiality of the flight data during the transmission and to prevent unauthorized access and tampering of the flight data during the transmission. The encryption password may also be stored in the storage terminal 200 to allow the storage terminal 200 to decrypt the flight data.

The storage terminal public key may include a verification public key and/or an encryption public key delivered by the storage terminal 200 to the aerial vehicle 100 to allow the aerial vehicle 100 to use the storage terminal public key to encrypt the data information transmitted to the storage terminal 200. Specifically, the storage terminal public key may be used together with a storage terminal private key. The storage terminal private key may be stored in the storage terminal to decrypt the data information transmitted to the storage terminal 200. Thus, the reliability of the flight data transmission may be ensured.

The first memory 110 may include a computer-readable storage medium, such as, for example, a USB flash drive, a removable hard disk, a read-only memory (ROM), a random access memory (RAM), a magnetic disk, a CD-ROM, or another medium that can store program codes.

The first processor 130 may establish a communication connection, generate the encryption password, and use the encryption password to encrypt the flight data of the aerial vehicle 100. In some embodiments, after the first processor 130 receives a control instruction requesting communication connection, the first processor 130 may use the encryption password to encrypt the flight data, append the aerial vehicle ID to the flight data, and use the storage terminal public key to encrypt the flight data. The encryption password may include a fixed password stored in the first memory 110 or a random password. The random password may be obtained by the first processor 130 through a pre-determined algorithm or randomly extracted by the first processor 130 from a password database.

The first processor 130 may include a central processing unit (CPU), a microprocessor, or another data processing chip.

The first data transmitter 150 may transmit the encryption password and the encrypted flight data carrying the aerial vehicle ID.

The first data receiver 170 may receive the storage terminal public key and the transmission status returned by the storage terminal 200.

The storage terminal 200 includes a second memory 210, a second processor 230, a second data transmitter 250, and a second data receiver 270.

The second memory 210 may store the flight data uploaded by the aerial vehicle 100, the aerial vehicle ID, the encryption password, the storage terminal public key, and the storage terminal private key.

The second processor 230 may decrypt the encrypted encryption password and flight data, and may verify the authenticity of the flight data and return a transmission status. In some embodiments, after the storage terminal 200 receives the encrypted encryption password, the second processor 230 may use the storage terminal private key to decrypt the encrypted encryption password and store the encryption password to allow the data transmitted between the aerial vehicle 100 and the storage terminal 200 to be encrypted by the encryption password. After the storage terminal 200 receives the flight data, the second processor 230 may match and verify the aerial vehicle ID carried in the flight data to determine the origin of the flight data or to associate the flight data with the corresponding aerial vehicle 100. Subsequently, the second processor 230 may generate a transmission status based on the determination and/or the decryption result.

The second processor 230 may include a central processing unit (CPU), a microprocessor, or another data processing chip.

The second data transmitter 250 may transmit the transmission status to the aerial vehicle 100.

The second data receiver 270 may receive the flight data.

The control terminal 300 includes a controller 330 and a data transceiver 350.

The controller 330 may control the aerial vehicle 100 to transmit the flight data and/or receive the transmission status.

The data transceiver 350 may transmit a control instruction for requesting establishing a communication connection, a control instruction for transmitting the flight data, and/or a control instruction for receiving the transmission status.

Referring again to FIG. 1, the flight data exchanging system S1 includes the data connection circuit 10, the data transmission circuit 30, the data storage circuit 50, and the message management circuit 70. In some embodiments, the functions of the circuits of the flight data exchanging system S1 may be implemented by program codes stored in a memory and executable by a corresponding processor. For example, the first memory 110 and/or the second memory 210 may store program codes that can be executed by the first processor 130 and/or the second processor 230 and/or executed by the first data transmitter 150 and the second data transmitter 250 to establish a data communication connection. The first memory 110 may store program codes that can be executed by the first processor 130, the first data transmitter 150, and/or the first data receiver 170 to transmit data, such as the flight data. The second memory 210 may store program codes that can be executed by the processor 230, the second data transmitter 250, and/or the second data receiver 270 to, e.g., receive the flight data, transmit the status of the flight data transmission.

In some embodiments, the data connection circuit 10 may establish a data communication connection between the storage terminal 200 and the aerial vehicle 100. The data transmission circuit 30 may control the aerial vehicle 100 to transmit the flight data. The data storage circuit 50 may control the storage terminal 200 to receive the flight data, and may control the storage terminal 200 to transmit the status of the flight data transmission. The message management circuit 70 may control the storage terminal 200 to send messages to the aerial vehicle 100. Details of various circuits of the flight data exchanging system S1 are described below.

Figure 3:
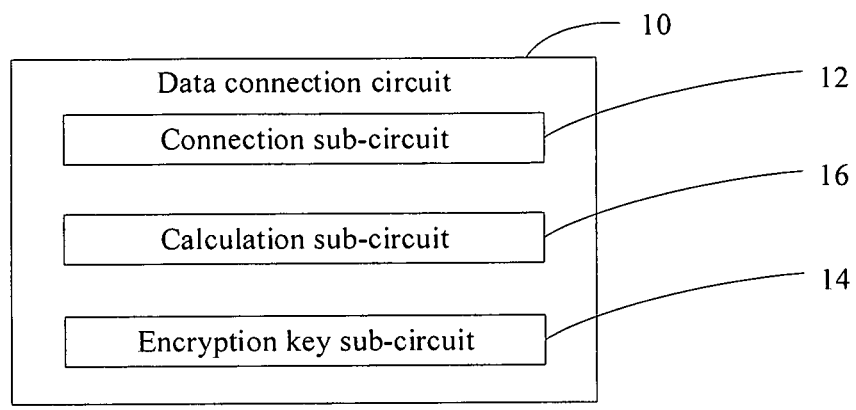
FIG. 3 is a schematic structural diagram of an example data connection circuit of the flight data exchanging system in FIG. 1.

FIG. 3 is a schematic structural diagram of an example data connection circuit of the flight data exchanging system in FIG. 1. The data connection circuit 10 may establish a data communication connection between the storage terminal 200 and the aerial vehicle 100. As shown in FIG. 3, the data connection circuit 10 includes a connection sub-circuit 12, a calculation sub-circuit 16, and an encryption key sub-circuit 14.

The connection sub-circuit 12 may control the aerial vehicle 100 to request a data connection. In some embodiments, after the connection sub-circuit 12 receives a control instruction for requesting to establish a data communication connection, the connection sub-circuit 12 may control the aerial vehicle 100 to request a data communication connection from the storage terminal 200.

The encryption key sub-circuit 14 may control the storage terminal 200 to send the storage terminal public key to the aerial vehicle 100. In some embodiments, after the storage terminal 200 receives a request for a data communication connection, the encryption key sub-circuit 14 may control the storage terminal 200 to send the storage terminal public key to the aerial vehicle 100.

The calculation sub-circuit 16 may generate an encryption password and encrypt the encryption password. In some embodiments, the calculation sub-circuit 16 may control the first processor 130 to generate the encryption password, and may use the storage terminal public key to encrypt the encryption password. The calculation sub-circuit 16 may control the first data transmitter 150 to send the encryption password to the storage terminal 200.

After the storage terminal 200 receives the encrypted encryption password, the encryption key sub-circuit 14 may also control the second processor 230 of the storage terminal 200 to use the storage terminal private key to decrypt and store the encryption password.

After the storage terminal 200 decrypts the encryption password, the connection sub-circuit 12 may establish a data communication connection between the storage terminal 200 and the aerial vehicle 100. In one embodiment, the communication connection between the aerial vehicle 100 and the storage terminal may be based on hypertext transfer protocol secure (HTTPS).

Figure 4:
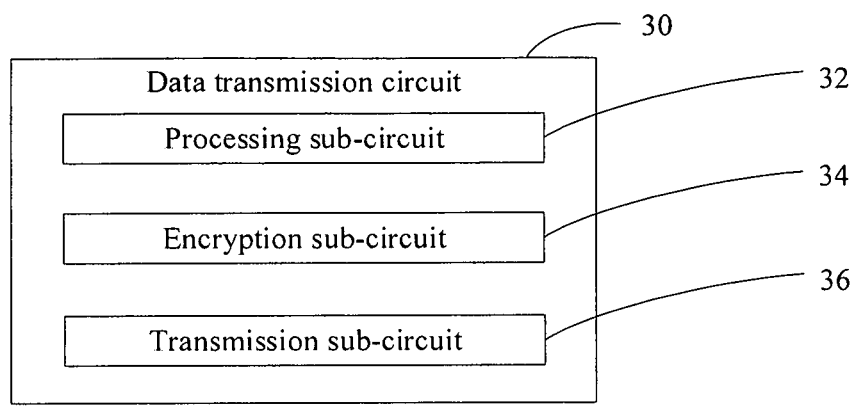
FIG. 4 is a schematic structural diagram of an example data transmission circuit of the flight data exchanging system in FIG. 1.

FIG. 4 is a schematic structural diagram of an example data transmission circuit of the flight data exchanging system in FIG. 1. The data transmission circuit 30 may control the aerial vehicle 100 to transmit flight data. In some embodiments, as shown in FIG. 4, the data transmission circuit 30 includes a processing sub-circuit 32, an encryption sub-circuit 34, and a transmission sub-circuit 36.

The processing sub-circuit 32 may obtain a control instruction for transmitting the flight data, generate a flight code, and append the flight code to the flight data. In some embodiments, the processing sub-circuit 32 may control the first processor 130 to obtain the control instruction for transmitting the flight data, control the first processor 130 to generate the flight code, and append the flight code to the flight data.

The encryption sub-circuit 34 may encrypt the flight data. In some embodiments, the encryption sub-circuit 34 may control the first processor 130 to encrypt the flight data. The encryption method for encrypting the flight data may include a symmetrical encryption algorithm or an asymmetrical encryption algorithm. In some embodiments, the encryption sub-circuit 34 may use the encryption password to encrypt the flight data, and may use the storage terminal public key to encrypt the flight data.

The processing sub-circuit 32 may also control the first processor 130 to append the aerial vehicle ID to the encrypted flight data.

The transmission sub-circuit 36 may control the first data transmitter 150 of the aerial vehicle 100 to transmit the flight data.

Figure 5:
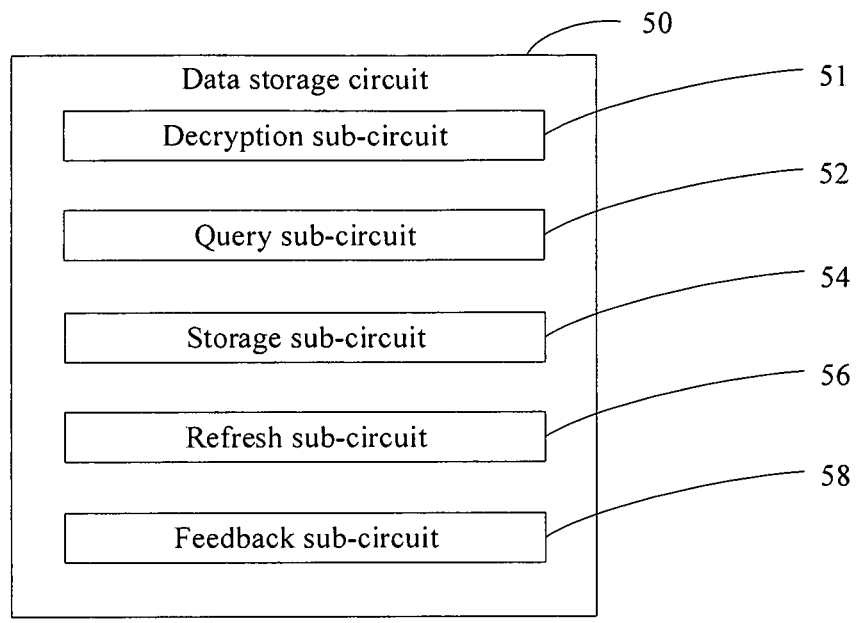
FIG. 5 is a schematic structural diagram of an example data storage circuit of the flight data exchanging system in FIG. 1.

FIG. 5 is a schematic structural diagram of an example data storage circuit of the flight data exchanging system in FIG. 1. The data storage circuit 50 may control the storage terminal 200 to receive the flight data, and may control the storage terminal 200 to transmit the status of the flight data transmission. In some embodiments, as shown in FIG. 5, the data storage circuit 50 includes a decryption sub-circuit 51, a query sub-circuit 52, a storage sub-circuit 54, a refresh sub-circuit 56, and a feedback sub-circuit 58.

The decryption sub-circuit 51 may receive and decrypt the flight data. In some embodiments, the decryption sub-circuit 51 may control the second receiver 270 of the storage terminal 200 to receive the flight data. The decryption sub-circuit 51 may also control the second processor 230 to decrypt the flight data.

The query sub-circuit 52 may verify the aerial vehicle ID carried in the flight data. In some embodiments, the query sub-circuit 52 may control the second processor 230 to query and match the aerial vehicle ID from the aerial vehicle IDs stored in the second memory 210. When the aerial vehicle ID carried in the flight data is found in the aerial vehicle IDS stored in the second memory 210, the query sub-circuit 52 may control the second processor 230 to associate the flight data with the corresponding aerial vehicle.

The storage sub-circuit 54 may categorize the flight data based on the flight code, store the flight data accordingly, and establish a flight data index. In some embodiments, the storage sub-circuit 54 may control the second processor 230 to establish the index based on the flight code, categorize the flight data, and store the flight data in the second memory 210. In some embodiments, when the flight code is categorized, the storage sub-circuit 54 may determine a category based on the result after applying a hash algorithm to the flight code. In some embodiments, the flight data is stored in a database. In some embodiments, the flight data may be stored in a Redis database, a MySQL database, an SQL server database, and/or an Oracle database. After the storage sub-circuit 54 stores the flight data, the refresh sub-circuit 56 may control the second processor 230 to refresh an update time of the flight data.

The feedback sub-circuit 58 may control the second processor 230 to generate the status of the flight data transmission.

Figure 6:
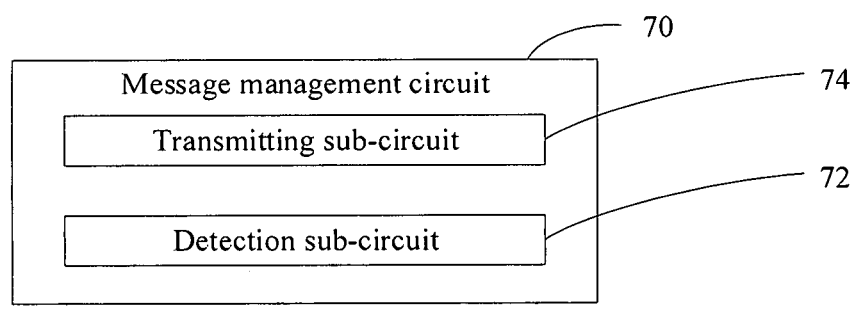
FIG. 6 is a schematic structural diagram of an example message management circuit of the flight data exchanging system in FIG. 1.

FIG. 6 is a schematic structural diagram of an example message management circuit of the flight data exchanging system in FIG. 1. The message management circuit 70 may control the storage terminal 200 to send messages to the aerial vehicle 100. In some embodiments, as shown in FIG. 6, the message management circuit 70 includes a detection sub-circuit 72 and a transmitting sub-circuit 74.

The detection sub-circuit 72 may detect whether the storage terminal 200 needs to transmit a message to the aerial vehicle 100. When the storage terminal 200 needs to transmit a message to the aerial vehicle 100, the detection sub-circuit 72 may control the second processor 230 to append the message to the transmission status.

The transmitting sub-circuit 74 may control the second data transmitter 250 to transmit the message to the aerial vehicle 100.

Consistent with the disclosure, the data connection circuit may establish a secure communication connection between the aerial vehicle and the storage terminal, use a random password to encrypt the data transmitted between the aerial vehicle and the storage terminal, and ensure security and reliability of subsequent data transmission. At the same time, by using the encryption password to encrypt the flight data, the flight data transmission may be secured, the content of the fight data may not be revealed, and unauthorized access to or tampering of the flight data during the transmission may be prevented. In addition, the flight data exchanging system may use the storage terminal private key and the storage terminal public key to asymmetrically encrypt the flight data to further enhance the security and confidentiality of the flight data during the transmission. In the flight data exchanging system, the storage terminal may return a transmission status to the aerial vehicle. Thus, the status of the flight data transmission may be recorded to facilitate the flight data management.

Figure 7:
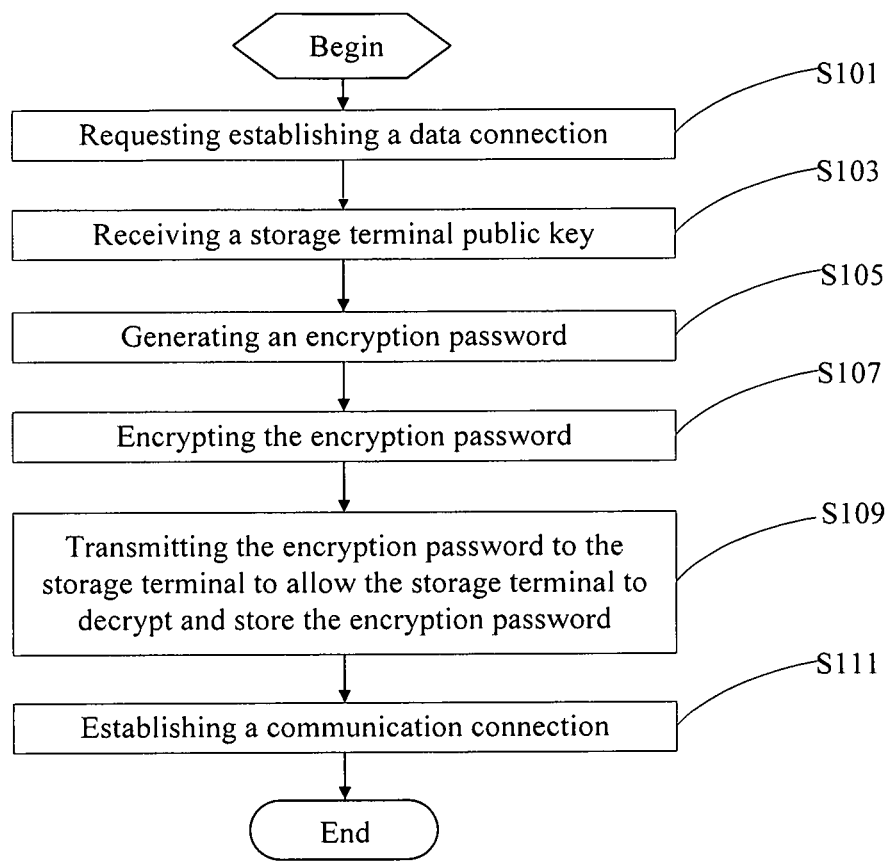
FIG. 7 is a flow chart of an example data communication connection method according to an example embodiment.

FIG. 7 is a flow chart of an example data communication connection method according to an example embodiment. In some embodiments, the method may be implemented by a processor. The processes and the sequence of the processes in the flow chart shown in FIG. 7 are intended to be illustrative, and not to limit the scope of the present disclosure. In some other embodiments, the processes shown in FIG. 7 may be removed and/or re-arranged, and/or additional process may be added.

In some embodiments, the data communication connection method may be applied to the data connection circuit 10 to establish a data connection between the aerial vehicle and the storage terminal. It should be understood that the data communication connection method may be applied to the data connection between another aerial vehicle and the storage terminal and the data connection between different storage terminals.

As shown in FIG. 7, at S101, establishment of a data connection is requested. In some embodiments, after the connection sub-circuit 12 receives a control instruction for requesting to establish a data communication connection, the connection sub-circuit 12 may control the aerial vehicle 100 to request a data communication connection from the storage terminal 200.

At S103, a storage terminal public key is received. In some embodiments, after the storage terminal 200 receives a request for data communication connection, the encryption key sub-circuit 14 may control the storage terminal 200 to send the storage terminal public key to the aerial vehicle 100 and control the first data receiver 170 of the aerial vehicle 100 to receive the storage terminal public key.

In some embodiments, receiving the storage terminal public key (S103) may be omitted.

At S105, an encryption password is generated. In some embodiments, the calculation sub-circuit 16 may control the first processor 130 to generate the encryption password, and the aerial vehicle 100 may use the storage terminal public key to encrypt the encryption password.

At S107, the encryption password is encrypted. In some embodiments, an asymmetrical encryption algorithm may be used to encrypt the encryption password. In some embodiments, the encryption key sub-circuit 14 may control the second processor 230 of the storage terminal 200 to use the storage terminal private key to decrypt the encryption password and store the encryption password.

In some other embodiments, a symmetrical encryption algorithm may be used to encrypt the encryption password. For example, the encryption key sub-circuit 14 may control the second processor 230 of the storage terminal 200 to use a fixed password to encrypt the encryption password.

In some embodiments, generating the encryption password (S105) may be omitted and, correspondingly, encrypting the encryption password (S107) may also be omitted.

At S109, the encryption password is transmitted to the storage terminal, and the storage terminal decrypts and stores the encryption password. In some embodiments, the calculation sub-circuit 16 may control the first data transmitter 150 to transmit the encryption password to the storage terminal 200. After the storage terminal 200 receives the encrypted encryption password, the encryption key sub-circuit 14 may control the second processor 230 of the storage terminal 200 to use the storage terminal private key to decrypt the encryption password and to store the encryption password in the second memory 210.

When the encryption password is encrypted using a symmetrical algorithm at S107, the encryption password may be decrypted using the same symmetrical algorithm at S109.

In the embodiments that encrypting the encryption password (S107) is omitted, transmitting, decrypting, and storing the encryption password (S109) may also be omitted.

At S111, a communication connection is established. The process can then be ended. In some embodiments-, the connection sub-circuit 12 may control the second processor 230 and/or the first processor 130 to establish a data communication connection between the storage terminal 200 and the aerial vehicle 100. The communication connection between the aerial vehicle 100 and the storage terminal 200 may be based on hypertext transfer protocol secure (HTTPS). In some embodiments, the connection sub-circuit 12 may control the first processor 130 of the aerial vehicle 100 to establish the data communication connection between the storage terminal 200 and the aerial vehicle 100.

In some other embodiments, the communication connection between the aerial vehicle 100 and the storage terminal 200 may be based on hypertext transfer protocol (HTTP).

Figure 8:
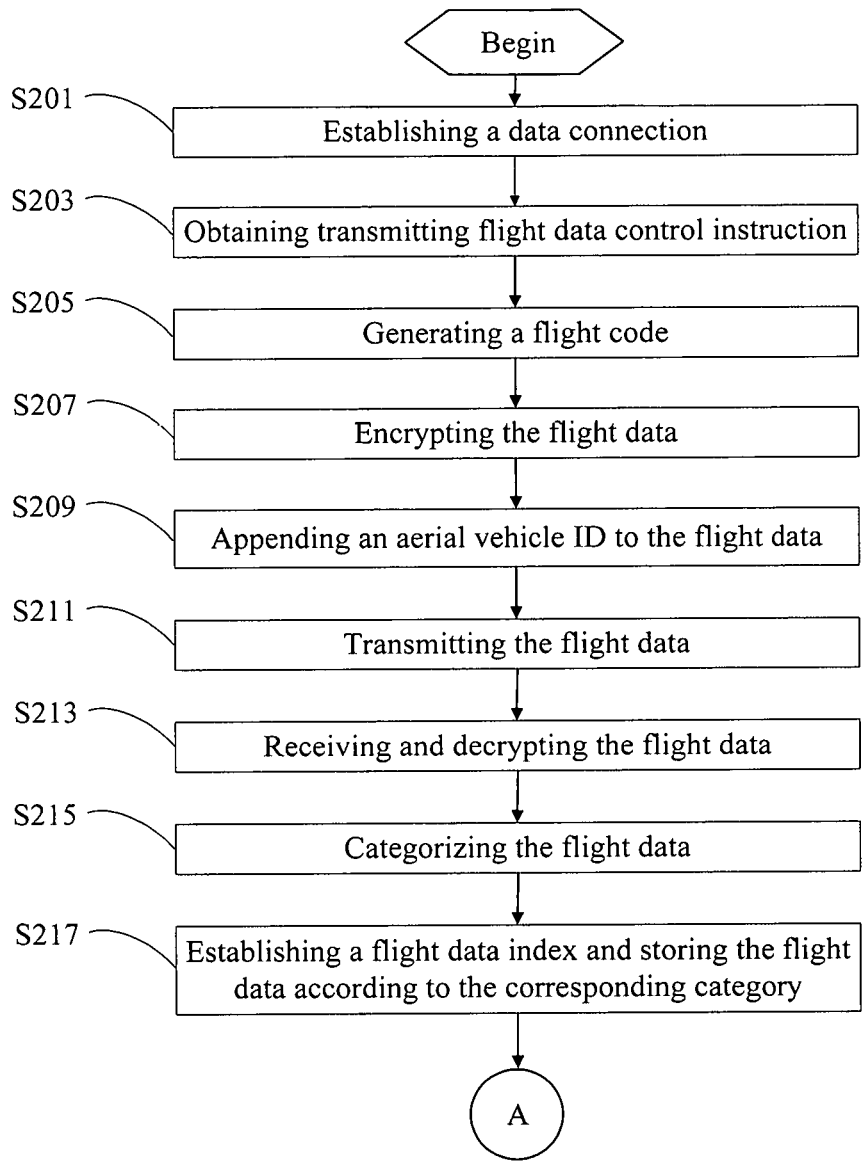
FIG. 8 and FIG. 9 show a flow chart of an example flight data exchanging method according to an example embodiment.
Figure 9:
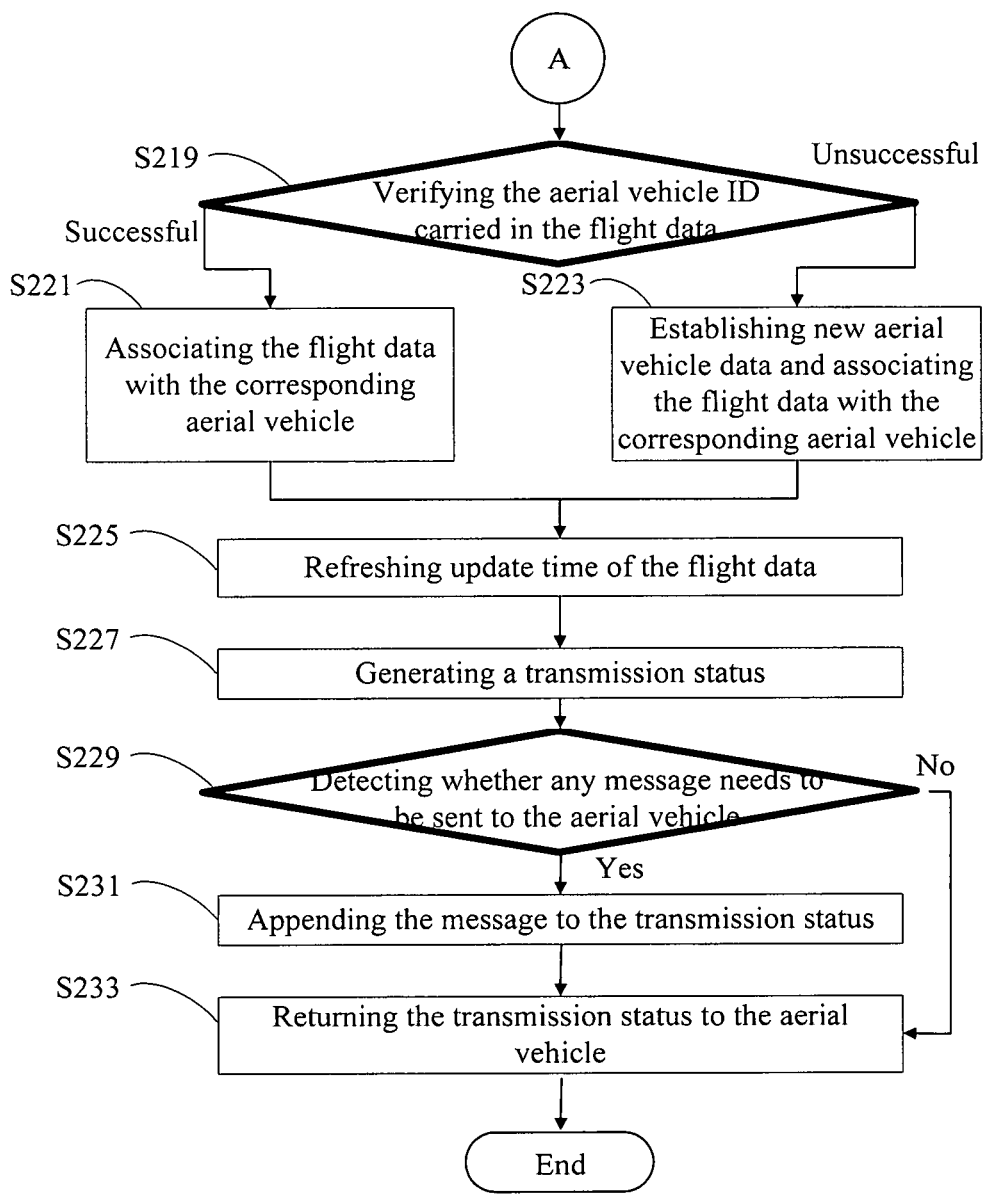

FIG. 8 and FIG. 9 show a flow chart of an example flight data exchanging method according to an example embodiment. In some embodiments, the method may be implemented by a processor. The processes and the sequence of the processes in the flow chart shown in FIG. 8 and FIG. 9 are intended to be illustrative, and not to limit the scope of the present disclosure. In some embodiments, the processes shown in FIG. 8 and FIG. 9 may be removed and/or re-arranged, and/or additional process may be added.

In some embodiments, the data communication connection method may be applied to the flight data exchanging system S1 to upload the flight data of the aerial vehicle to a server.

As shown in FIG. 8, at S201, a data connection is established. In some embodiments, the data connection circuit 10 may establish the data communication connection between the aerial vehicle 100 and the storage terminal 200 using a data communication connection method consistent with the disclosure, such as one of the above-described example methods. In some embodiments, the connection sub-circuit 12 of the data connection circuit 10 may control the second processor 230 of the storage terminal 200 to establish the data communication connection between the aerial vehicle 100 and the storage terminal 200.

In some embodiments, establishing the data connection (S201) may be omitted. In some embodiments, the data communication connection between the aerial vehicle and the storage terminal already exists, and establishing the data connection (S201) may be omitted.

At S203, a control instruction for transmitting the flight data is obtained. In some embodiments, the processing sub-circuit may control the first processor 130 to obtain a control instruction for transmitting the flight data. The control instruction may be sent by the control terminal 300 or by the storage terminal 200. Further, the control instruction may be generated by the aerial vehicle 100.

At S205, a flight code is generated, and appended to the flight data. In some embodiments, the processing sub-circuit 32 may control the first processor 130 to generate the flight code and to append the flight code to the flight data. The flight code may be stored in a flight code database in advance. In some embodiments, the encryption sub-circuit 30 may generate a random code, for example, by randomly extracting the code—from a random code database. The flight code may include a combination of one or more digits, alphabets, and special characters.

In some embodiments, the processing sub-circuit 32 may generate the flight code through a pre-determined algorithm. The pre-determined algorithm may include a calculation formula pre-configured in the processing sub-circuit 32. For example, specific information of the flight data (e.g., size of the data, flight time, flight altitude) may be substituted to the calculation formula to calculate the flight code.

At S207, the flight data is encrypted. In some embodiments, the encryption sub-circuit 30 may control the first processor 130 to encrypt the flight data. The encryption method for encrypting the flight data may include a symmetrical algorithm or an asymmetrical algorithm. In some embodiments, the encryption sub-circuit 30 may use the encryption password to encrypt the flight data, or may use the storage terminal public key to encrypt the flight data.

In some embodiments, encrypting the flight data (S207) may be omitted.

At S209, an aerial vehicle ID is appended to the flight data. In some embodiments, the encryption sub-circuit 30 may control the first processor 130 to append the aerial vehicle ID to the encrypted flight data.

In some embodiments, appending the aerial vehicle ID to the flight data (S209) may be omitted.

At S211, the flight data is transmitted. In some embodiments, the transmission sub-circuit 36 may control the first data transmitter 150 of the aerial vehicle 100 to transmit the flight data.

At S213, the flight data is received and decrypted. In some embodiments, the decryption sub-circuit 51 may control the second data receiver 270 of the storage terminal 200 to receive the flight data, and may control the second processor 230 to decrypt the flight data.

In the embodiments that encrypting the flight data (S207) is omitted, there is no need to decrypt the flight data at S213.

At S215, the flight data is categorized. In some embodiments, the storage sub-circuit 54 may control the second processor 230 to categorize the flight data based on the flight code of the flight data. When the flight code is categorized, the storage sub-circuit 54 may determine a category based on the result after applying the hash algorithm to the flight code.

At S217, a flight data index is established, and the flight data is stored according to the category. In some embodiments, the storage sub-circuit 54 may control the second processor 230 to establish an index based on the flight code of the flight data, and may store the flight data in the second memory 210 according to the category. The flight data may be stored in a Redis database, a MySQL database, an SQL server database, and/or an Oracle database. In some embodiments, establishing the flight data index and storing the flight data according to the category (S217) may be omitted.

As shown in FIG. 9, at S219, the aerial vehicle ID carried in the flight data is verified. If the verification is successful, process S221 is executed. If the verification is unsuccessful, process S223 is executed. In some embodiments, to verify the aerial vehicle ID, the query sub-circuit 52 may control the second processor 230 to look up and match the aerial vehicle ID with aerial vehicle IDs stored in the second memory 210. When the aerial vehicle ID carried in the flight data is found from the aerial vehicle IDs stored in the second memory 210, matching may be determined to be successful, the verification may be determined to be successful, and process S221 may be executed. At this point, the query sub-circuit 52 may determine that the server already stores the existing flight data of the aerial vehicle. When the aerial vehicle ID carried in the flight data is not found from the aerial vehicle IDs stored in the second memory 210, matching may be determined to be unsuccessful, the verification may be determined to be unsuccessful, and process S223 may be executed. At this point, the query sub-circuit 52 may determine that the server does not store any existing flight data of the aerial vehicle.

In the embodiments that appending the aerial vehicle ID to the flight data (S209) is omitted, verifying the aerial vehicle ID (S219) may also be omitted.

At S221, the flight data is associated with the corresponding aerial vehicle. In some embodiments, the storage sub-circuit 54 may associate the flight data with the corresponding aerial vehicle.

In the embodiments that verifying the aerial vehicle ID (S219) is omitted, associating the flight data with the corresponding aerial (S221) may also be omitted.

At S223, new aerial vehicle data is established, and the flight data is associated with the corresponding aerial vehicle. In some embodiments, the storage sub-circuit 54 may use the aerial vehicle ID to establish the new aerial vehicle data in the second memory 210, and may associate the flight data with the corresponding aerial vehicle.

In the embodiments that verifying the aerial vehicle ID (S219) is omitted, establishing the new aerial vehicle (S223) may also be omitted.

At S225, an update time of the flight data is refreshed. In some embodiments, after the storage sub-circuit 54 stores the flight data, the refresh sub-circuit 56 may control the second processor 230 to refresh the update time of the flight data.

In some embodiments, refreshing the update time of the flight data (S225) may be omitted.

At S227, a transmission status is generated. In some embodiments, the feedback sub-circuit 58 may control the second processor 230 to generate the status of the flight data transmission.

At S229, whether any message needs to be transmitted to the aerial vehicle is detected. If a message needs to be transmitted, process S231 is executed. On the other hand, if no message needs to be transmitted, process S233 is executed.

At S231, the message is appended to the transmission status. When the detection sub-circuit 72 detects that a message needs to be transmitted to the aerial vehicle 100, the detection sub-circuit 72 may control the second processor 230 to append the message to the transmission status.

At S233, the transmission status is returned to the aerial vehicle. In some embodiments, the transmitting sub-circuit 74 may control the second data transmitter 250 to transmit the transmission status to the aerial vehicle 100.

Consistent with the disclosure, the data connection circuit may establish a secure communication connection between the aerial vehicle and the storage terminal, use a random password to encrypt the data transmitted between the aerial vehicle and the storage terminal, and ensure security and reliability of subsequent data transmission. At the same time, by using the encryption password to encrypt the flight data, the flight data may be safer during the transmission, the content of the fight data may not be revealed and unauthorized access to or tampering of the flight data during the transmission may be prevented. In addition, the flight data exchanging system may use the storage terminal private key and the storage terminal public key to asymmetrically encrypt the flight data to further enhance the security and confidentiality of the flight data during the transmission. In the flight data exchanging system, the storage terminal may return a transmission status to the aerial vehicle. Thus, the status of the flight data transmission may be recorded to facilitate the flight data management.

Figure 10:
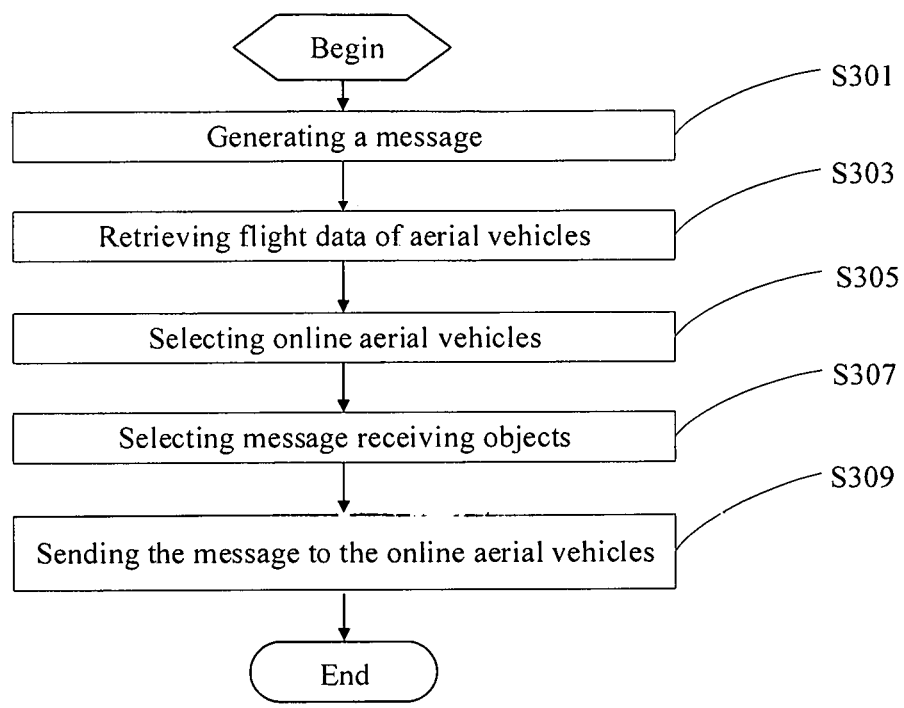
FIG. 10 is a flow chart of an example message push method according to an example embodiment.

FIG. 10 is a flow chart of an example message push method according to an example embodiment. In some embodiments, the method may be implemented by a processor. The processes and the sequence of the processes in the flow chart shown in FIG. 10 are intended to be illustrative, and not to limit the scope of the present disclosure. In some embodiments, the processes shown in FIG. 10 may removed or re-arranged, and/or additional process may be added.

In some embodiments, the message push method may be applied to the message management circuit of the flight data exchanging system S1, the aerial vehicle 100, and the storage terminal 200, such that the storage terminal 200 may transmit messages to the serial vehicle 100.

As shown in FIG. 10, at S301, a message is generated. In some embodiments, the transmitting sub-circuit 74 may control the second processor 230 to generate the message.

At S303, flight data of aerial vehicles is received. In some embodiments, the detection sub-circuit 72 may retrieve the flight data of the aerial vehicles 100 from the second memory 210. In some embodiments, the flight data of the aerial vehicle 100 may be retrieved based on the update times of the flight data of the aerial vehicle. In some embodiments, if a difference between the latest update time of the flight data of an aerial vehicle and the current time is within a pre-determined time range, the flight data of the aerial vehicle may be retrieved. The pre-determined time range may be approximately one hour, approximately two hours, approximately one day, approximately two days, or another desired time range.

At S305, one or more online aerial vehicles are selected. In some embodiments, the detection sub-circuit 72 may select the one or more online aerial vehicles based on the retrieved flight data of the aerial vehicles. The term "online" as used in this disclosure may refer to a state in which an aerial vehicle maintains a data communication connection with the storage terminal. Whether an aerial vehicle may be selected as an online aerial vehicle may depend on the update time of the flight data of the aerial vehicle. In some embodiments, when the detection sub-circuit 72 determines that a difference between the update time of the flight data of an aerial vehicle and the current time is within a pre-determined time range, the aerial vehicle may be selected as an online aerial vehicle. The pre-determined time range may be approximately one minute, approximately two minutes, approximately ten minutes, or another desired time range, to precisely select the one or more online aerial vehicles.

At S307, one or more objects for sending the message to (also referred to as "message receiving objects") are selected. In some embodiments, based on the message type, the detection sub-circuit 72 may control the second processor 230 to select an aerial vehicle to which the message needs to be sent. In some embodiments, based on the flight code of the flight data, the detection sub-circuit 72 may determine whether an aerial vehicle is within a group to which the message needs to be sent. In some embodiments, the group may include a set of aerial vehicles within a same flight code category. The flight code category may be determined by applying a hashing algorithm to the flight code.

In some embodiments, based on the flight behavior group corresponding to the flight data, the detection sub-circuit 72 may determine whether an aerial vehicle 100 is within a group to which a message needs to be sent. The group may include a set of aerial vehicles that satisfy a pre-determined condition. The group may include at least one of: one or more aerial vehicles 100 having flight coordinates within a pre-determined range, one or more aerial vehicles 100 having flight altitudes within a pre-determined range, or one or more aerial vehicles 100 having flight speeds within a pre-determined range.

At S309, the message is sent to the one or more online aerial vehicles. In some embodiments, the transmitting sub-circuit 74 may control the second data transmitter 250 to send the message to the one or more aerial vehicles 100.

In some embodiments, when a message is being sent to an aerial vehicle 100, it may not be limited to appending the message to the transmission status, but the message push method described above may be used. Based on message type, a message receiving object may be selected and a message may be sent to the object accordingly.

It should be understood that various embodiments of the flight data exchanging system and method may not be limited to the aerial vehicles and the storage terminal and may be applied to other mobile terminals or storage terminals, for example, aerial vehicle terminals, aerial vehicle controllers, remote-control terminals, and aerial vehicle regulatory platform, etc. In the disclosed embodiments, the data connection circuit may be an independent data connection system embedded in data connection devices such that the data connection devices may request and establish secure data communication connections for externally attached apparatus. The data connection devices may be mobile terminals or storage terminals, for example, aerial vehicle terminals, aerial vehicle controllers, remote-control terminals, and aerial vehicle regulatory platform, etc.

In the disclosed embodiments, the data transmission circuit may be an independent data transmission system embedded in data transmission devices such that the data transmission devices may transmit data to externally attached apparatus. The data transmission devices may be mobile terminals or storage terminals, for example, aerial vehicle terminals, aerial vehicle controllers, remote-control terminals, and aerial vehicle regulatory platform, etc.

In the disclosed embodiments, the data storage circuit may be an independent data storage system embedded in data storage devices such that the data storage devices may transmit data to externally attached apparatus. The data storage devices may be mobile terminals or storage terminals, for example, serves, aerial vehicle regulatory platform, aerial vehicle terminals, aerial vehicle controllers, and remote-control terminals, etc.

In the disclosed embodiments, the message management circuit may be an independent message management system embedded in message management devices such that the message management devices may transmit data to externally attached apparatus. The message management devices may be mobile terminals or storage terminals, for example, servers, aerial vehicle regulatory platform, aerial vehicle terminals, aerial vehicle controllers, and remote-control terminals, etc.

Those of ordinary skill in the art will appreciate that the example elements and algorithm steps described above can be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references can be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a processor, a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A method for establishing a data communication between a mobile terminal and a server, comprising:
   sending, by the mobile terminal, a request for establishing a data communication from the mobile terminal to the server for transmitting flight data to the server;
   receiving, by the mobile terminal, a server public key from the server, wherein the server public key is configured to encrypt an encryption password and the encryption password is configured to encrypt the flight data for data security;
   generating, by a first processor of the mobile terminal, the encryption password;
   encrypting, by the first processor, the encryption password using the server public key;
   transmitting, by a first data transmitter of the mobile terminal, the encrypted encryption password to the server for storing in the server;
   decrypting, by a second processor of the server, the encrypted encryption password using a server private key for storing the decrypted encryption password in the server;
   establishing the data communication between the mobile terminal and the server;
   receiving, by the first processor of the mobile terminal, a request for transmitting the flight data from the mobile terminal to the server;
   generating, by the first processor, a flight code configured to be appended to the flight data for identifying the flight data, wherein the flight code is a random code extracted from a random code database;
   encrypting, by the first processor, the flight data using one of the encryption password or the server public key;
   transmitting, by the first data transmitter of the mobile terminal, the encrypted flight data to the server;
   receiving, by a second data transmitter of the server, the encrypted flight data, and decrypting, by the second processor of the server, the encrypted flight data; and
   categorizing, by the second processor, the decrypted flight data according to the flight code corresponding to the flight data, and establishing, by the second processor, a flight data index for storing the flight data according to a category corresponding to the flight data.

2. The method of claim 1, wherein:
   the data communication is based on hypertext transfer protocol or hypertext transfer protocol secure.

3. The method of claim 1, wherein:
   the mobile terminal includes an aerial vehicle and the server includes an aerial vehicle regulatory platform.

4. The method of claim 1, wherein decrypting the encrypted flight data includes:
   in response to the flight data being encrypted using the encryption password, decrypting the encrypted flight data using the encryption password; and
   in response to the flight data being encrypted using the server public key, decrypting the encrypted flight data using the serve private key.

5. A message push method comprising:
   generating, by a server, a message requesting for a data communication from a mobile terminal to transmit flight data to the server;
   determining whether the mobile terminal is online by determining whether it is connected to a network;
   in response to determining that the mobile terminal is online being connected to the network, generating, by the mobile terminal, an encryption password configured to encrypt the flight data and a flight code configured to be appended to the flight data for identifying the flight data, wherein the flight code is a random code extracted from a random code database;

requesting both the encryption password and the flight data to be encrypted and transmitted from the mobile terminal to the server for respectively storing in the server; and sending the message to the mobile terminal, wherein:
- the encryption password is encrypted using a server public key received by the mobile terminal from the server; and
- the flight data is encrypted using one of the encryption password or the server public key.

6. The method of claim 5, further comprising:
after generating the message, retrieving the flight data of the mobile terminal,
wherein determining whether the mobile terminal is online includes determining that the mobile terminal is online if a difference between a latest update time of the flight data of the mobile terminal and a current time is within a pre-determined time range.

7. The method of claim 6, wherein:
the mobile terminal includes an aerial vehicle and the flight data of the mobile terminal is uploaded by the mobile terminal.

8. The method of claim 5, further comprising:
after generating the message, determining, based on a type of the message, whether the mobile terminal is in a group to which the message needs to be sent.

9. The method of claim 8, wherein:
the mobile terminal includes an aerial vehicle, and
determining whether the mobile terminal is in the group includes determining whether the mobile terminal is in the group based on the flight data uploaded by the mobile terminal.

10. The method of claim 9, wherein:
determining whether the mobile terminal is in the group based on the flight data includes determining whether the mobile terminal is in the group based on a flight behavior corresponding to the flight data.

11. The method of claim 10, wherein:
the group includes a set of mobile terminals that satisfy a pre-determined condition, the pre-determined condition including at least one of a flight coordinate being within a pre-determined range, a flight altitude being within a pre-determined range, or a flight speed being within a pre-determined range.

12. The message push method of claim 9, wherein:
determining whether the mobile terminal is in the group includes determining whether the aerial vehicle is in the group based on the flight code.

13. The message push method of claim 12, wherein:
the group includes a set of aerial vehicles within a same flight code category, and the flight code category is determined by applying a hashing algorithm to the flight code.

14. An aerial vehicle controller comprising:
a control terminal; and
a processor of the control terminal configured to:
- receive a data transmission instruction from the server;
- in response to receiving the data transmission instruction, generate an encryption password configured to encrypt the flight data a flight code configured to be appended to the flight data for identifying the flight data, wherein the flight code is a random code extracted from a random code database;
- encrypt the encryption password using a server public key received by the control terminal from the server and encrypt the flight data using one of the encryption password or the server public key; and
- transmit both the encrypted encryption password and the encrypted flight data to the server for storing in the server.

15. The controller of claim 14, wherein the flight code is generated by a hashing algorithm corresponding to the aerial vehicle.

* * * * *